Sept. 16, 1941.  J. C. PATERSON  2,256,168
CONVEYER OF THE ENDLESS BAND TYPE
Filed Sept. 28, 1938  2 Sheets-Sheet 1

J. C. Paterson
Inventor
By: Glascock Downing & Seebold
Attys.

Sept. 16, 1941.   J. C. PATERSON   2,256,168
CONVEYER OF THE ENDLESS BAND TYPE
Filed Sept. 28, 1938   2 Sheets-Sheet 2
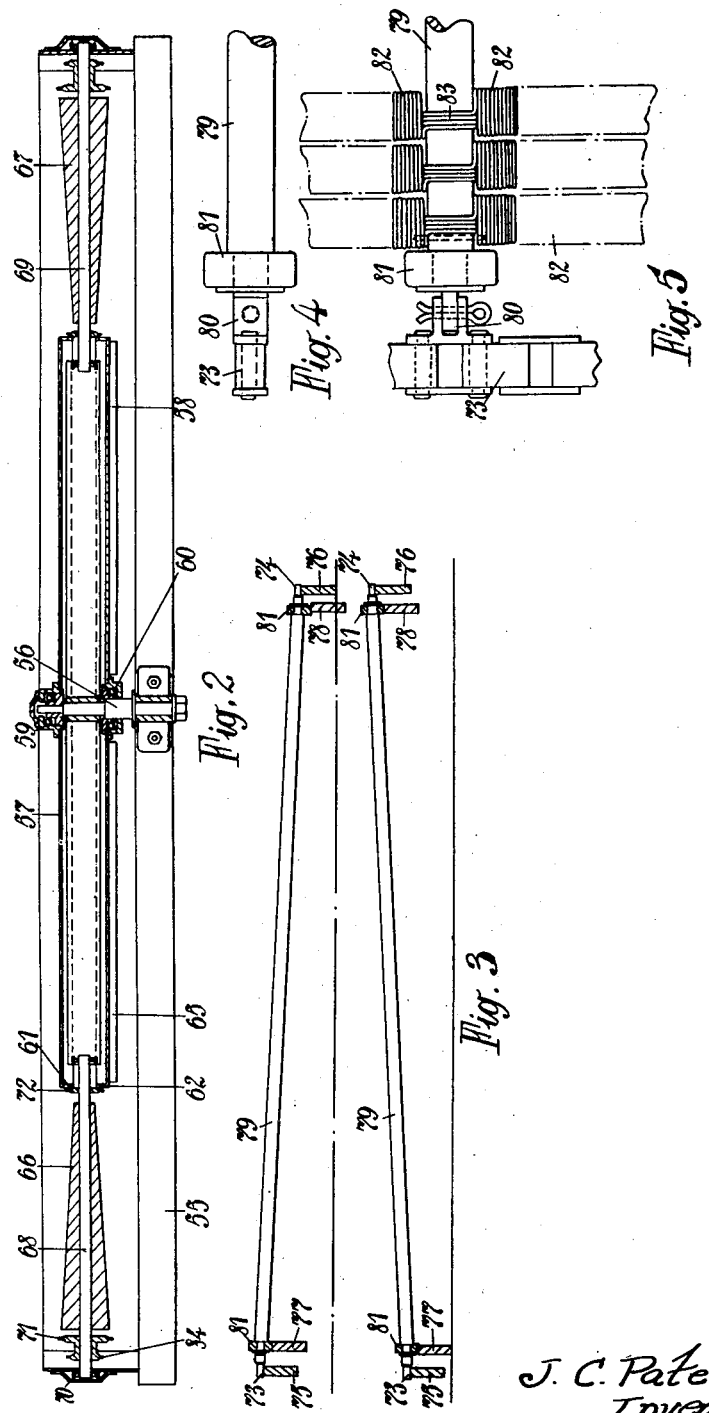

Patented Sept. 16, 1941

2,256,168

UNITED STATES PATENT OFFICE 2,256,168

CONVEYER OF THE ENDLESS BAND TYPE

John Currie Paterson, Peterborough, England, assignor to Baker Perkins Company Inc., Saginaw, Mich.

Application September 28, 1938, Serial No. 232,224
In Great Britain September 29, 1937

4 Claims. (Cl. 198—182)

This invention relates to conveyers of the endless band type and has for its object the provision of conveying means adapted to change the direction of travel of the articles conveyed, or turn them through an arc, or convey them on a curved path.

The invention consists in an openwork conveying surface adapted for travel in an arcuate path. Chains are provided at the inner and outer margins of the conveying surface, being supported upon inner and outer guiding tracks or rails of arcuate form.

The return lap of the endless band may be supported in a path approximately parallel to and in spaced relationship beneath the upper conveying surface of the band.

According to a further feature, transverse or radial members or spokes are provided between the inner and outer chains, novel surface elements being located between said spokes. The segmental surface consists of a plurality of elements such as coiled springs extending between the spokes. This construction provides a novel improved endless conveyer band economical to construct and having a desirable distribution of drive and load stresses which affords an easy-running conveyer exceptionally free from tendencies to warp or buckle in operation.

The invention further provides a novel supporting and guiding assembly for conveyers operating to change the direction of travel of articles, turning them through arcs up to 180 degrees. This improved assembly is adapted for use either with the conveyer belt shown and described in the application of E. D. Rapisarda for United States patent, Serial No. 166,635, filed September 30, 1937, or with the conveyer belt of this application. In this improved assembly the inner margin of the band in its upper and lower laps engages and abuts travelling guide elements comprising a pair of superposed freely mounted discs or ring elements.

In the accompanying drawings:

Fig. 2 is a vertical section taken along the axes of the rollers 67 in Fig. 1;

Fig. 3 is a part-sectional view taken radially of the conveyer intermediate the rollers 67; and Figs. 4 and 5 are detailed elevation and plan views of a portion of the improved conveyer surface of the invention.

Figure 1:
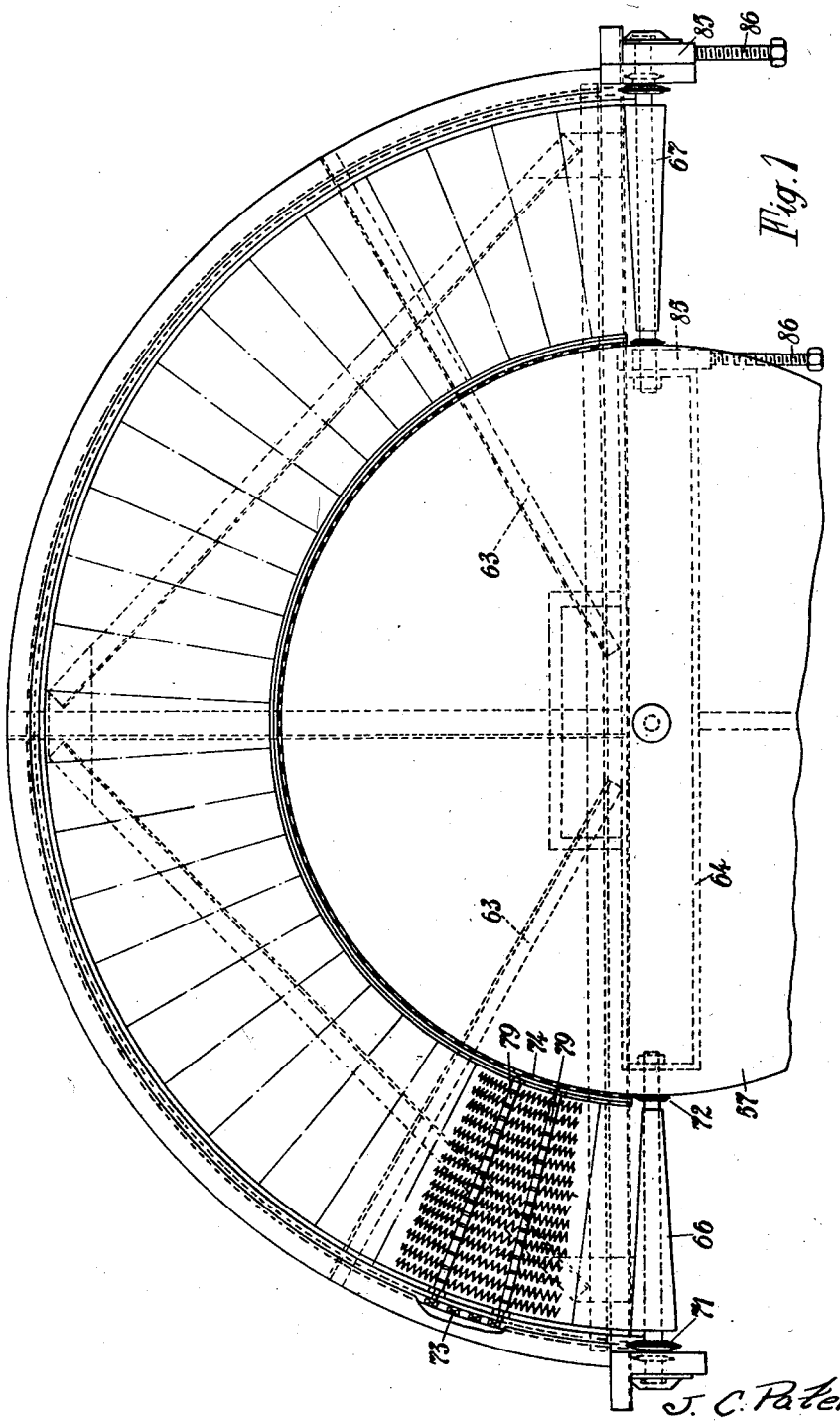
Fig. 1 is a plan of an arcuate conveyer according to the invention showing the conveyer surface diagrammatically.

Figs. 1 through 5 show the invention applied to an angular conveyer suitable for transporting articles such as biscuits in a semicircular path to change the direction of travel through 180°, a longitudinally extending frame or girder 55 is provided which supports adjacent its centre a vertically extending stub shaft 56. The stub shaft forms a bearing for a pair of spaced discs 57, 58 which are adapted to move freely upon the shaft by the aid of ball or other suitable bearings 59, 60. The discs 57, 58 are provided with rims 61, 62 extending downwardly and upwardly toward one another but leaving a space therebetween.

In addition to its being carried by the disc, the upper rim is supported upon a series of rollers, for example, three rollers arranged at 120° with one another. These rollers (not shown) are carried by radially arranged bars or angle irons 63 which extend through the space between the rims before mentioned. At their inner ends the bars are secured to a second frame element 64 which is located between the discs, such element being arranged parallel to the main frame or girder element and secured to the stub shaft 56. The lower rim 62 may also be provided with supporting rollers or the associated disc may be strengthened by suitable radial ribs 65 or elements secured thereto.

Located on either side of the discs and on an extended diameter thereof is a pair of terminal rollers 66, 67 for the conveyer element or band. These rollers are of coned or tapered form, the smaller ends being located adjacent the edges of the discs 64, 65. The rollers 66, 67 form the nosings around which the conveyer band turns as it travels from the upper to the lower lap or vice versa. The rollers are carried by shafts 68, 69 supported at their inner ends by the inner frame element 64 located between the discs, the shafts extending through the space between the disc rims 61, 62.

The outer ends of the roller shafts are supported by suitable bearings 70 which are carried by the main frame member 55.

At either end of the roller shafts 68, 69 sprocket wheels 71, 72 are provided for driving chain elements 73, 74 which form the side margins of the conveying surface. These chains may be of any suitable construction adapted to permit them to conform to the curvature of the conveying surface which it will be appreciated is of semi-annular form in agreement with the centre discs 57, 58.

The chains 73, 74 are supported upon curved tracks or rails 75, 76 which are carried by suitable framework supported by the radial bars 63 before mentioned, there being upper and lower tracks for the upper and lower runs of each chain. These tracks do not carry the whole weight of the conveying surface but are auxiliary to main supporting tracks or rails 77, 78 located inwardly of the chain tracks.

Between each chain and secured thereto is a series of round bars or spokes 79 located radially from the centre of the discs. The spokes at either end are pivotally connected to the chains on horizontal axes, the chains being provided or formed at spaced intervals with forked fittings 80 (see Figures 4 and 5) for this purpose. The spokes 79 are also provided adjacent their ends with supporting rollers 81 which are adapted to run on the main supporting tracks 77 and 78.

The spokes 79 together with the inner and outer chains 73, 74 thus form a series of truncated sectors and these are filled in by a novel flexible supporting surface.

This surface consists of a multiplicity of flexible, closely wound resilient springs 82 which extend from spoke to spoke. The springs are provided with end loops 83 which are threaded on to the spokes 79 so that the tops of the springs lie in the plane of the tops of the spokes.

The length of the springs is such that they are only put under slight tension, it being appreciated that in each space there will be a series of springs which gradually increase in length as indicated in Figure 1. Adjacent springs are preferably slightly spaced apart, as in Fig. 5, and may be held in their position by grooving or nicking the spokes 79 at the appropriate position.

Adjacent the end springs the spokes are provided with holes for accommodating split pins to retain the springs in position. The section of the springs 82 may be circular, square, flattened or of other form as desired.

With a conveying surface or band curved so that the articles travel around an arc it will be appreciated that there is a natural tendency for the surface to move towards the centre and in the arrangement under discussion this movement is taken up by the formation of lateral abutments against which the inner chain elements 74 contact. These lateral abutments are provided by the disc rims 61, 62, and by the free mounting of the discs 57, 58 so that they revolve by the frictional contact of the chain 74 therewith as the conveying surface travels. It will be appreciated, therefore, that an efficient angular conveyer means is provided in which friction between the relatively moving parts is reduced to a minimum. The conveyer band lies exceptionally flat in its working plane and is free from localized tendencies to binding which introduces stresses tending to initiate warping and buckling. All tensions in the surface are exerted circumferentially, due to the stiff radial spokes 79, and tensions transmitted from the driving chain are not exerted through the mesh tangentially to the inner arc of the band, but are transmitted radially by the spokes. The circumferential tensions of the plurality of springs 82 have the same flattening effect over the entire width of the band as do the circumferentially threaded coil springs 22 shown in Fig. 6 of the Rapisarda application above referred to.

The terminal rollers 66 are driven in any suitable manner, for example by sprocket wheels 84 mounted on the shafts 68 and 69 adjacent outer ends of the rollers.

For tensioning the conveyer surface the bearings of the terminal roller shaft 69 are mounted in sliding blocks 85 to which adjusting screw means 86 are operatively connected, the adjusting screw at the inner end projecting between the disc rims 61, 62.

With the axes of the shafts 68, 69 horizontal it will be appreciated that the upper conveying surface will be inclined to the horizontal, such surface may however be in a horizontal plane by inclining the shafts.

The conveyer supporting and driving assembly described, including the idler disks 57, 58, is useful not only with the specific conveyer band herein described, in which inward stresses are transmitted by the spokes 79 to the freely moving rims 61, 62 of the disks (see Fig. 2), but can also be advantageously employed with the conveyer band and chain assembly in the Rapisarda application hereinbefore mentioned. The inner chain of this conveyer, corresponding to chain 74 in Figures 1 and 3 of this application, is positively held against inward movement and is carried by the rims 61, 62 with complete absence of sliding friction.

The conveyer surface herein shown and described is the subject also of my U. S. Patent No. 2,253,913, issued August 26, 1941, and filed October 27, 1939, as a continuation-in-part of this application.

I claim:

1. A conveying device comprising an openwork endless band arranged for travel in a curved or semicircular path between terminal radial roller means, said band comprising inner and outer chain elements connected by spaced radial spokes and flexible, closely wound coiled springs closely adjacent each other extending between the spokes.

2. A conveying device comprising an endless flexible band arranged for travel in a curved or semicircular path between terminal radial rollers, said band being provided with a drive chain attached along its inner periphery engaging abutment means comprising freely mounted discs of radius at least equal to the width of the band which travel with the laps of the chain.

3. A conveying device comprising an endless openwork band arranged for travel in a curved or semicircular path between radial roller elements, said band comprising inner and outer driving chain elements connected by spaced radial spokes and flexible, closely coiled springs extending between the spokes and spaced closely adjacent each other, the inner chain element engaging abutment means comprising freely mounted discs which travel with the laps of the chain.

4. A conveying device as claimed in claim 3 wherein arcuate supporting tracks for said band are provided beneath the ends of the spokes and extending between said radial roller elements and the spokes are provided with end rollers engaging said supporting tracks.

JOHN CURRIE PATERSON.